March 3, 1942.   A. A. FRIESTEDT   2,275,137
METHOD OF AND MEANS FOR DETERMINING THE
ANGULAR RELATION BETWEEN WHEEL AXES
Filed April 24, 1940
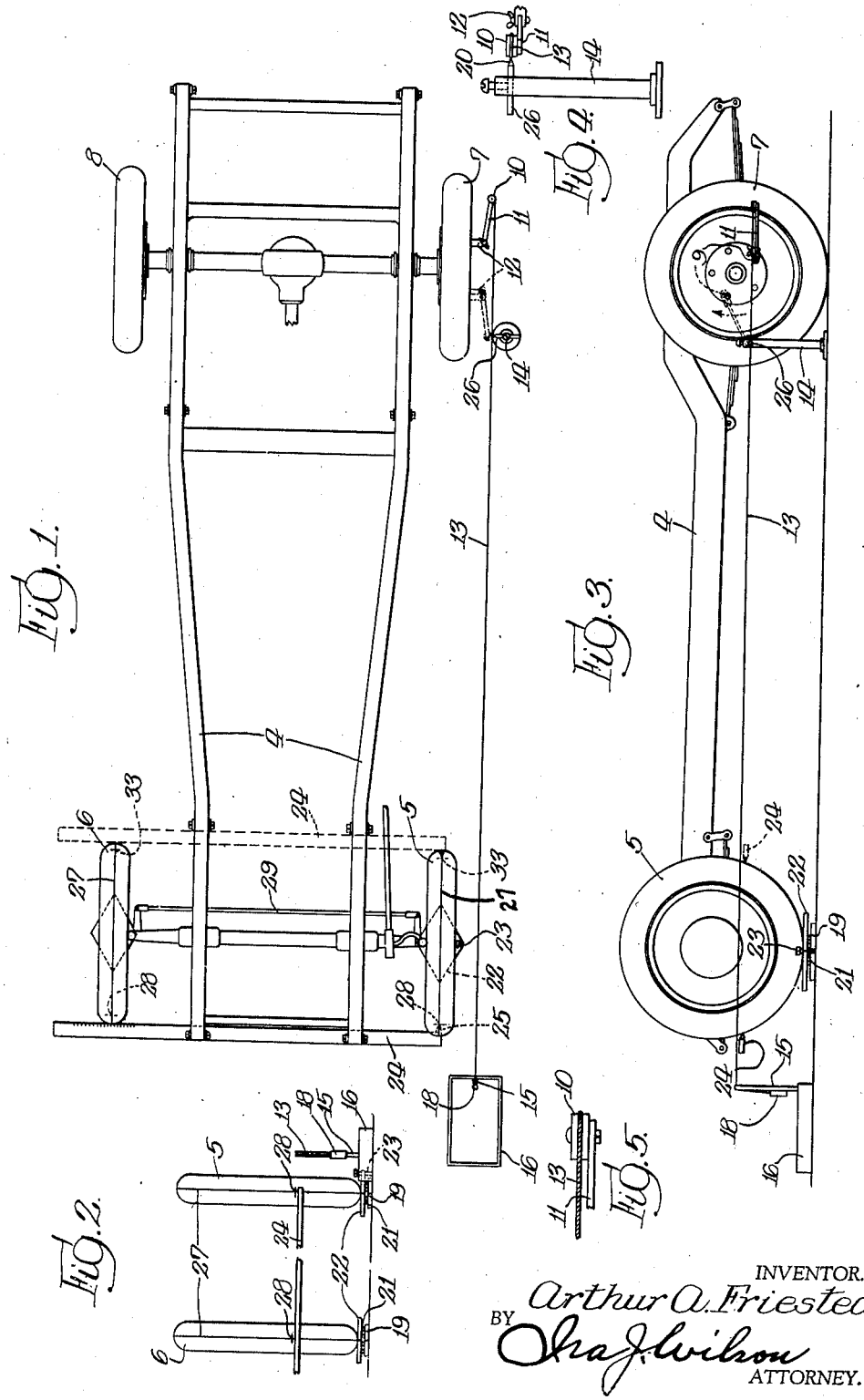

Patented Mar. 3, 1942

2,275,137

UNITED STATES PATENT OFFICE 2,275,137

METHOD OF AND MEANS FOR DETERMINING THE ANGULAR RELATION BETWEEN WHEEL AXES

Arthur A. Friestedt, Chicago, Ill.

Application April 24, 1940, Serial No. 331,449

8 Claims. (Cl. 33—203)

This invention relates to a method and means for determining the angular axial relation between the shafts or spindles upon which wheels or pulleys are mounted. The purpose of the invention is to ensure accuracy of angular relationship between the axes of such shafts or spindles by establishing a line perpendicular to one of the axes and utilizing such line as the base for measurement in making the required adjustments.

The advantages of my invention reside in the simplicity of the method and means employed and in the geometrical and mathematical accuracy of the results attained thereby. More specifically my improved method facilitates establishing coordination between the dormant, or directly ahead, steering position of automotive vehicles and the true courses of their road wheels.

Other advantages are economy in the manufacture and shipment of the apparatus, because of its compactness and light weight and in the time consumed in effecting a desired angular relationship in accordance with my method.

While the principles of my invention may be utilized in achieving a desired angular relationship of shafts and spindles in a wide variety of machines and installations, I have here shown for illustrative purposes the employment of my invention in achieving the desired angular axial relationship of the axle and spindles of the ground wheels of an automobile. For this use my invention is particularly suitable, as it ensures accuracy in results irrespective of the weight, size or wheel base of the vehicle.

It will be appreciated that rotating elements, such as vehicle wheels and power pulleys, are frequently inaccurately made or are sprung or deformed so that their contours do not rotate in planes perpendicular to their axes and, consequently, they appear to wabble on their axes. Because of such inaccuracies in structure, wheels or pulleys themselves cannot be used as a basis for attaining the desired relationship of their axes of rotation. Any single point on a revolving wheel or pulley, however, always travels in an arc or circle the plane of which is perpendicular to the axis of rotation and a chord of the arc described by such point always extends perpendicular to such axis. The establishment of a line perpendicular to one of the axes to be axially related and the utilization of such line as the basis for the determination of any angular axial inaccuracy and the correction thereof, are fundamental factors inherent in the principles of my invention.

A preferred form of apparatus capable of use in practicing my method is illustrated on the accompanying drawing.

Referring to the drawing,

Fig. 1 is a plan view of an automobile chassis and wheels and illustrating the manner of use of my apparatus in practicing my novel method;

Fig. 2 is an end elevation looking toward the right at Fig. 1;

Fig. 3 is a side elevation looking at the near side of Fig. 1;

Fig. 4 is a detail view showing the relation of the cord and marker point; and

Fig. 5 is a fragmentary view of the button carrying arm.

On the drawing, the chassis is indicated generally by reference character 4, the front wheels by reference characters 5 and 6, respectively, and the rear wheels by reference characters 7 and 8.

The apparatus comprises an arm adapted to be attached to and extend outwardly from one of the rear wheels, and preferably consisting of a base 9 provided with an opening to receive a bolt carried by the wheel, such, for instance, as one of the bolts by which the wheel is attached to the hub or one of the bolts by which a demountable rim is held in position, and an arm 11 frictionally mounted upon an extension from said base and preferably held by a bolt equipped with a thumb nut 12 which, when loosened, will permit angular adjustment of the arm 11 toward or away from the wheel. To the outer end of the arm 11 is attached an annularly grooved disc or button 10 to which is secured one end of a line or cord 13 adapted to be extended forwardly from the button groove alongside the vehicle in contact with marker point 20 projecting laterally from a standard 14, and over a second forward guide 15 of the same height as the marker point preferably pivotally mounted in the box 16 in which the equipment is packed for shipment. The guide 15 may be swung upwardly into vertical position, as shown, and the line is held taut over the guide 15 and touching the marker point by a weight 18 or a spring attached to its forward end in front of the guide 15.

A pair of turntables, one for each of the front wheels of the vehicle, is also supplied, each turntable consisting of a base 19 upon which is rotatably supported upon ball or roller bearings 21 a flat platform or table 22 which may be easily rotated and may, when the wheel resting thereon has been adjusted, be locked against rotary movement by a set screw 23 threaded into engagement with the floor.

The equipment also includes a measuring rod or stick 24 of a greater length than the transverse distance between wheel centers and equipped at one end with a prong or brad 25 which, when pressed into the tire, will hold that end of the rod or stick in predetermined position.

The method of procedure in carrying out my novel method of determining angular axial relationship is substantially as follows:

One of the front wheels is raised off the floor with an ordinary jack and is then revolved while a piece of chalk or other marking material is held against lateral movement in contact with the surface of the wheel tire. Any preferred holder for the marking material may be used, but in the present instance I have shown the standard 14 as equipped with a marker 26 so that when the standard is set flat on the floor with the marker touching the tire, rotation of the wheel and tire will cause a circular mark to be made upon the tire periphery. A plane including this circular mark on the tire will obviously be disposed perpendicularly to the axis of the wheel.

One of the turntables is then slid under the wheel, and the wheel is lowered onto it, as illustrated in the drawing. It may be mentioned that the platforms or tables of the turntables are preferably diamond shape in contour, as shown in Fig. 1, to enable them to be packed in the box 16 and occupy a minimum of space therein. After the wheel has been lowered onto the turntable, a transverse mark across the tire is made by the marker 26 both at the front and at the rear of the tire about seven inches above the floor, which is substantially the height at which the cord 13 is disposed.

The other front wheel is thereupon raised, and the same procedure is followed in producing a circular marking upon the tire periphery, lowering the wheel onto a turntable and marking transverse lines on the tire surface at the front and rear thereof. The circular lines on the tires are indicated on the drawing by reference character 27, and the transverse markings at the front of the wheels by reference character 28 and at the rear thereof by 33. It may be conducive to accuracy in some instances to apply the transverse lines on the tire surfaces after both front wheels have been lowered onto the turntables and the rear wheel has been elevated, as hereinafter explained.

The base 9 of the arm 11 is next rigidly attached to one of the rear wheels, in the present instance wheel 7, to which it is shown as attached by one of the wheel holding bolts by which the wheel is secured to the hub. The arm is positioned by loosening the connection 12, if necessary, so that it may extend outwardly from the plane of the wheel. This wheel is then jacked up so that it just frictionally engages the floor, but is capable of being rotated by hand. The wheel is then rotated to bring the arm 11 into the dotted line position shown in Fig. 3, whereupon the standard 14 is moved to a position to dispose the marker point 20 contiguous to the line or cord disposed in the peripheral groove of the button 10. The groove is of less diameter than the cord, so that the cord projects outwardly therefrom.

The wheel is then rotated until the groove of the button 10 is positioned at the rear of the wheel at the same height, as shown in full lines, as it was when in the dotted line position at the front of the wheel. The line or cord 13 is then extended forwardly from the button 10, so that it just contacts with the marker point 20 in which position it is held taut by the weight 18 at its forward end. This weight draws the line over a guide in the upper end of the standard 15 which is so positioned that the cord extends in a straight line touching the marker point of the standard 14 and resting in the groove of the button at the end of the arm 11.

Since it is obvious that rotation of the wheel 7, as previously described, will cause the button 10 to travel in an arc in a plane perpendicular to the axis of said rear wheel, the line 13 included in or parallel to such plane and constituting a chord of such arc also extends perpendicular to the axis of said rear wheel. This line thus established is utilized as a basis for the adjustment of the front wheels in the following manner.

The front wheel to which the steering mechanism is directly connected is the one to be adjusted first, which on the drawing is the wheel designated by reference character 5. In this instance, before any adjustment is made the clamps at each end of the tie rod 29 connecting the front wheels are both loosened. The steering wheel is then manipulated until the desired distances between the cord 13 and the line 27 at the points of its intersection with transverse marks 28 and 33 at the front and rear of the wheel are attained. These distances are determined by measurement between intersection point 27, 28 and the line 13 and intersection point 27, 33 and the line 13. The turntable beneath the wheel just adjusted is then locked by the set screw 23 to maintain the wheel in its adjusted position.

The desired angular relationship between the other front wheel and the one already aligned is next obtained by turning the loosened tie rod until the desired distances between the intersecting points of horizontal and annular marks on the two front wheel tire treads, forwardly and rearwardly of their spindles, are determined. In measuring these distances, the measuring stick or graduated rod 24 is employed. The brad 25 is pushed into the tire of the wheel 5 at the intersection of the annular and horizontal lines, either forward or rearward of the wheel spindles, and then the distance to the annular line on wheel 6 at the height of line 28 is determined, whereupon the stick is removed and similarly used at the rear side of the wheel, as indicated in dotted lines in Fig. 1. By so adjusting the wheel 6 that the distance from the circular line 27 at the rear of this wheel to the line 27 at the rear of the opposite wheel is greater by the requisite amount than the distance between the corresponding lines at the front of the wheels, the requisite toe-in of the front wheels is obtained.

From the foregoing, it will be apparent that I have provided a method which can be practiced with extreme rapidity and which will be absolutely reliable in the results attained. The apparatus employed is simple and manually portable, and it also consists of but few parts which can be compactly packed in the box 16 for shipment and for storage when not in use.

It should be noted that with this method all measurements are based on lines perpendicular to the axes of the respective wheels, instead of from the wheels themselves which are usually inaccurate. In other words, my invention contemplates determining the relationship between the axes of rotation of the wheels instead of aligning the wheels themselves. Consequently, the true bearings will be disposed in the requisite angular axial relationship, regardless of any deformation which may be present in the wheel structure.

The structural details of the apparatus and the sequence of operations in practicing the method may obviously be considerably varied without exceeding the scope of the invention as defined in the following claims.

I claim:

1. An apparatus for determining the angular axial relationship of the axes of vehicle wheels comprising an arm adapted to be fixedly attached to a rear wheel of a vehicle so as to project outwardly therefrom, a standard adapted to be positioned to dispose a point carried thereby contiguous to a predetermined point carried by said arm when disposed forwardly of the wheel axis, a line attached to the end of said arm, and means forwardly of the front wheels for holding said line taut in a vertical plane including the end of said arm and said standard point.

2. The method of determining the angular axial relationship between the wheel axes of a vehicle, which comprises fixing relatively to one of the rear wheels a point located outwardly from the outer face of said wheel, locating the position of said point when the same is disposed forwardly of the wheel axis, partially rotating the wheel to dispose said point rearwardly of the axis at substantially the same height as said located position, extending a straight line from said point at the rear of the axis through said located position to a position forwardly of the front wheels, imposing upon the perimeter of a front wheel both forwardly and rearwardly of the axis thereof a mark disposed in a plane perpendicular to the axis of said wheel, and determining the relative positions of said marks with respect to said line as a basis for adjustment of said front wheel.

3. The method of determining the angular relation between the wheel axes of a vehicle provided with front and rear wheels, which comprises fixing a point at a constant radial distance from the axis of one of said rear wheels, moving said point in an arc from a position spaced above the floor forwardly of the wheel axis to an approximately corresponding height above the floor rearwardly of the wheel axis, extending a straight line in or parallel to the plane of the arc generated by said point to a position forwardly of the front wheels, marking the periphery of each front wheel forwardly and rearwardly of the axis thereof in a plane perpendicular to the axis of such wheel, and measuring the distances between said line and said marks to thereby determine the relationship of said front wheel axes to said rear wheel axis.

4. The method of determining the angular axial relationship between the axes of the wheels of a multi-wheel vehicle, which consists in moving a point in an arc in a plane perpendicular to the axis of one of the rear wheels, extending a straight line in or parallel to said plane to a point forwardly of the axis of a front wheel, imposing marks upon the periphery of said front wheel forwardly and rearwardly of the wheel axis and in a plane perpendicular to said axis, and measuring the distance between said marks and said line.

5. An apparatus by which the angular relation between the axes of rotation of a plurality of rotatable elements may be determined, comprising an arm adapted to be fixedly attached to one of said elements so as to position a predetermined point on said arm at a substantial radial distance from the axis of rotation of said element, a standard adapted to be positioned to dispose a point carried thereby contiguous to said first mentioned point when positioned at one side of said axis, a line attached to said arm, and means for holding said line taut in proximity to an axis to be aligned and in a vertical plane including said positioned standard point and said predetermined arm point when rotated about said first axis to a position on the opposite side of said axis from said standard point.

6. The method of determining the angular relationship between the axes of rotation of a plurality of rotatable elements, which consists in moving a point carried by one of said elements in an arc in a plane perpendicular to the axis of one of said elements, locating on said arc a plurality of substantially spaced apart points, extending a secant through said points into proximity to the axis of an element to be related, locating a plurality of spaced apart points in a plane perpendicular to said second axis, and determining the space relation between each of said second points and said extended secant.

7. The method of determining the angular relationship between the axes of rotation of a plurality of rotatable elements, which consists in moving a point in an arc in a plane perpendicular to the axis of one of said elements, extending a secant from said arc into proximity to the axis to be related, locating a plurality of points in a plane perpendicular to said second axis, and measuring the distances between said second points and said secant.

8. The method of determining the relation between the axes of rotation of a plurality of rotatable elements, which consists in imparting a rotative movement to each of said elements, establishing by said movement a plane perpendicular to each of said axes, locating at approximately a common level in each of said planes a plurality of spaced apart points, said points in each plane being disposed respectively forwardly and rearwardly of the axis of rotation of such element, extending a straight line through or parallel to the located points in one plane into proximity to the located points in the other plane, and measuring the distances between said line and said located points in said other plane to thereby determine the relative angular relation of said axes.

ARTHUR A. FRIESTEDT.